United States Patent

Philipps

[15] 3,645,707

[45] Feb. 29, 1972

[54] GLASS FIBER COATING METHOD

[72] Inventor: Thomas E. Philipps, Granville, Ohio

[73] Assignee: Owens-Corning Fiberglas Corporation

[22] Filed: Feb. 9, 1970

[21] Appl. No.: 10,054

[52] U.S. Cl. ................................. 65/3, 19/66 R, 28/15 M, 28/72 NW, 65/4, 117/126 GS, 117/126 GQ
[51] Int. Cl. .......................................................... C03c 25/02
[58] Field of Search ............... 117/126 GS, 126 GQ, 126 GO; 65/2, 3, 4; 19/66 R; 28/1 SM, 72 NW

[56] References Cited

UNITED STATES PATENTS

| 2,859,506 | 11/1958 | Slayter | 28/1 SM |
| 3,081,207 | 3/1963 | Fox | 117/126 GO |
| 3,192,089 | 6/1965 | Clark | 117/126 GS |
| 3,332,830 | 7/1967 | Tomlinson et al. | 117/126 GQ |
| 3,395,069 | 7/1968 | Plueddemann | 117/126 GS |

*Primary Examiner*—Arthur D. Kellogg
*Assistant Examiner*—Robert L. Lindsay, Jr.
*Attorney*—Staelin and Overman and John C. Purdue

[57] ABSTRACT

A method of using a composition in the treatment of glass fibers to provide easier filamentizing of fiber strands, said composition is especially adapted for use on glass fibers which are to be used in the production of glass fiber mats when maximum water-repellent properties are desired. In a preferred embodiment the composition consists of phenyltrimethoxy silane in a suitable solvent.

8 Claims, No Drawings

GLASS FIBER COATING METHOD

BACKGROUND OF THE INVENTION

1. Field of the Invention

In general most glass fiber mat products are made by impregnating a mat of either continuous or discontinuous glass fibers with a binder composition containing a synthetic thermosetting resin and other additives and then heating the mat to cure the resin. In some instances the glass fibers are in the form of continuous strands which in forming the mat are laid down in substantially sinusoidal waveform. This provides improved tensile strength to the mat, as compared to mats made of randomly oriented discontinuous fibers. Such additional strength makes them useful in many installations in which they could not otherwise be used, e.g., as roofing mats.

In the manufacture of roofing mats from strands of glass fibers, for example by the method where strands of fibers are formed from attenuated glass streams pulled over rollers or wheels which draw the streams of fine fibers or filaments together to form the strands, it is important that the strands be later filamentized (separated) to provide the necessary small interstices between individual fibers into which a subsequently applied resinous binder and reinforcing material such as asphalt can penetrate. Filamentizing is important so that uniform distribution of the resin or other additive material throughout the mat can be achieved, without uniform resin distribution channels through which water can actually flow in extreme cases develop at areas of weakness not covered by the resin.

2. Description of the Prior Art

Several methods of filamentizing the strands have been suggested, e.g., by impingement upon the strands of high velocity streams of fluid such as water, or gaseous fluids, to overcome forces holding the filaments together in the strand.

The present invention is concerned with an improvement of this method, which involves pretreating the glass fiber strands with a composition which acts to reduce the surface tension of the impinging water enabling it to penetrate further into the interstices of the glass fiber strand, thus aiding the filamentizing process above described. This allows better fiber distribution and easier penetration or better "wet out" of the subsequently applied resin or other material into the interstices. Inasmuch as a sizing agent has to be applied to continuous fibers to prevent them from abrading one another during the mat manufacturing operation (and thereby causing a loss in tensile strength), the ideal composition would serve as a size, and also serve to reduce the surface tension of the impinging water on the fibers thereby aiding filamentizing.

The invention is concerned with sizing and filamentizing compositions which allow greatly improved filamentizing of glass fiber strands to be achieved.

OBJECTS

It is an object of this invention to provide a sizing and filamentizing aid composition for application to glass fibers.

It is a further object of this invention to provide a sizing and filamentizing aid composition which when applied to glass fibers acts to reduce the surface tension of water or other aqueous solutions subsequently applied thereto.

It is a further object of this invention to provide a process for producing glass fiber mats wherein the fibers are treated with the compositions of this invention.

SUMMARY OF THE INVENTION

In accordance with this invention a composition is provided which has the dual function of sizing and aiding filamentizing of fibers. The composition comprises compounds selected from the group consisting of alkyltrialkoxy silanes, dialkyldialkoxy silanes, alkylphenyldialkoxy silanes, diphenyldialkoxy silanes, phenyltrialkoxy silanes, and chloropropyltrialkoxy silanes; preferred silanes are alkylalkoxy silanes where the alkoxy groups have from one to two carbon atoms, stearyldimethylbenzyl ammonium chloride, alkylamine acetate, wherein the alkyl group ranges from about 12 to about 20 carbon atoms, and mixtures thereof in a suitable solvent such as Stoddard solvent. The last three compounds mentioned, however, are not as effective as the silane compounds.

Preferred silanes are those in which the alkoxy groups are methyl radicals. Especially preferred silanes are phenyltrimethoxy silane and chloropropyltrimethoxy silane. Other suitable compounds include those recited above. All of the above-described compounds are commercially available. The silanes in particular are available as solutions of the compound in a solvent. A particularly suitable solvent is Stoddard solvent, although any other suitable solvent can be used. When the above-stated composition is applied to glass fibers and glass fiber strands, it serves to decrease the surface tension of subsequently applied impinging water, allowing the strands to be more easily filamentized by the impinging water and allowing the later applied resin or other additive better to penetrate into the interstices of the strand and saturate or "wet out" completely the glass fibers.

The process of this invention comprises forming glass fibers by attenuating streams of molten glass issuing from bushings, treating the glass fibers with the composition of the invention, forming the fibers into strands, projecting the strands onto a collecting surface in a predetermined pattern, filamentizing the strands, applying a binder composition to the strands, and heating to cure the binder composition.

The filamentizing composition is preferably applied to individual glass fibers by means of a roll applicator shortly after the fibers are formed. This enables the composition to be distributed equally over the entire surface of each of the individual fibers. Suitable apparatus for accomplishing the application is well-known in the art. It is not essential that the composition be applied in that manner. Any method would be suitable as long as substantially uniform distribution of the composition on the individual fibers is obtained.

The preferred method of filamentizing of the treated fibers is in the manner described above; however, other methods would be equally satisfactory. Thus, once the fibers are treated, the strands formed therefrom can be filamentized by simply flexing the strand, or by impinging air. Almost any physical disturbance will cause the treated strand to filamentize, thereby allowing the resinous binder to penetrate into the interstices.

As has been hereinbefore indicated, after the glass fiber strands in the mat have been filamentized and the resin or other binder applied, the mat is then normally led through an oven where the resin is cured. An additional benefit of this invention is that when the mat is heated, the preferred silane compounds present as a size tend to polymerize and interact with the surface of the glass fibers thus forming a water-repellent surface on the fibers. This is of particular benefit when the mat is to be used as a roofing mat.

EXAMPLE I

A mixing tank equipped with a propeller-type agitator was charged with 200 parts by weight of water and agitated while 1 part by weight of phenyltrimethoxy silane was added thereto. The mixture was agitated until all of the silane was in solution. The solution was then applied to glass fibers by means of a roll applicator after the fibers were formed by attenuating streams of molten glass drawn from bushings. Thereafter the fibers were formed into strands. The glass strands were then formed into a porous mat and filamentized by impingement thereon of water in the manner described above; thereafter, a resinous binder composition was applied thereto as the mat was carried along by a conveyor. The glass fiber mat was then cured in an oven at a temperature of about 450° F.; thereafter it was impregnated with asphalt and cut into appropriate sizes. The product was eventually placed on a roof.

The distribution of the filaments within the glass fiber mat is substantially better when the glass fibers are treated with the composition of the invention than in mats formed of glass fibers not so treated, thus demonstrating that better fiber distribution is achieved by using the filamentizing compositions of the invention. Better distribution of the binder within the mat is also obtained.

Desirably the phenyltrimethoxy silane or other compound is added to the fibers in such quantity that it forms at least a monomolecular layer on the fibers to aid the filamentizing process. The quantity can be varied as desired, however. Generally, it is applied in a water solution diluted to such an extent that the compound constitutes from about 0.1 to about 1 percent by weight of the solution.

It will be understood that various changes can be made in the details of formulation of the filamentizing composition of this invention, as well as in the application thereof, without departing from the scope and spirit of the invention.

What I claim is:

1. The process of manufacturing a glass fiber mat which comprises attenuating molten streams of glass into glass fibers, treating the glass fibers with a dilute solution in a suitable solvent of a composition comprising a compound selected from the group consisting of alkyltrialkoxy silanes, dialkyldialkoxy silanes, alkylphenyldialkoxy silanes, diphenyldialkoxy silanes, phenyltrialkoxy silanes, and chloropropyltrialkoxy silanes, wherein the alkyl and alkoxy groups range from one to two carbon atoms, stearyldimethylbenzyl ammonium chloride, alkylamine acetate, where the alkyl group ranges from about 12 to about 20 carbon atoms, and mixtures thereof, forming the fibers into strands, forming a mat by projecting the strands onto a collecting surface in a predetermined pattern, filamentizing the strands of the mat by impingement of a fluid thereon, applying a resinous binder composition to the strands, and curing the resinous binder composition by the application of heat.

2. The process of claim 1 wherein the filamentizing compound is phenyltrimethoxy silane.

3. The process of claim 1 wherein the filamentizing compound is chloropropyltrimethoxy silane.

4. The process of claim 1 wherein the solvent is Stoddard solvent.

5. The process of manufacturing a glass fiber mat which comprises attenuating streams of molten glass into glass fibers, treating the glass fibers with a dilute solution in a suitable solvent of a composition comprising a compound selected from the group consisting of methyltrimethoxy silane, dimethyldimethoxy silane, methylphenyldimethoxy silane, diphenyldimethoxy silane, phenyltrimethoxy silane, and chloropropyltrimethoxy silane, and mixtures thereof, forming the fibers into strands, projecting the strands onto a collecting surface in a predetermined pattern, filamentizing the strands of the mat by impingement of a fluid thereon, applying a resinous binder composition to the strands, and curing the resinous binder composition by the application of heat.

6. The process of claim 5 wherein the filamentizing compound is phenyltrimethoxy silane.

7. The process of manufacturing a glass fiber mat which comprises attenuating streams of molten glass into glass fiber filaments, gathering the filaments into strands, treating the surfaces of the filaments with a dilute solution in a suitable solvent of a composition comprising from about 0.1 to 1 percent by weight of a compound selected from the group consisting of alkyltrialkoxy silanes, dialkyldialkoxy silanes, alkylphenyldialkoxy silanes, diphenyldialkoxy silanes, phenyltrialkoxy silanes, chloropropyltrialkoxy silanes, wherein the alkyl and alkoxy groups range from one to two carbon atoms, stearyldimethylbenzyl ammonium chloride, akylamine acetate, where the alkyl group ranges from about 12 to about 20 carbon atoms, and mixtures thereof, projecting the strands of treated filaments, onto a collecting surface in the form of a mat, spraying a fluid onto the mat to separate the filaments of the strands, applying a resinous binder composition to the strands, and curing the resinous binder composition by the application of heat.

8. The process of claim 7 in which the mat is additionally impregnated with asphalt.

* * * * *